(No Model.)
A. CLARK.
HARROW OR CULTIVATOR TOOTH.
No. 356,985. Patented Feb. 1, 1887.
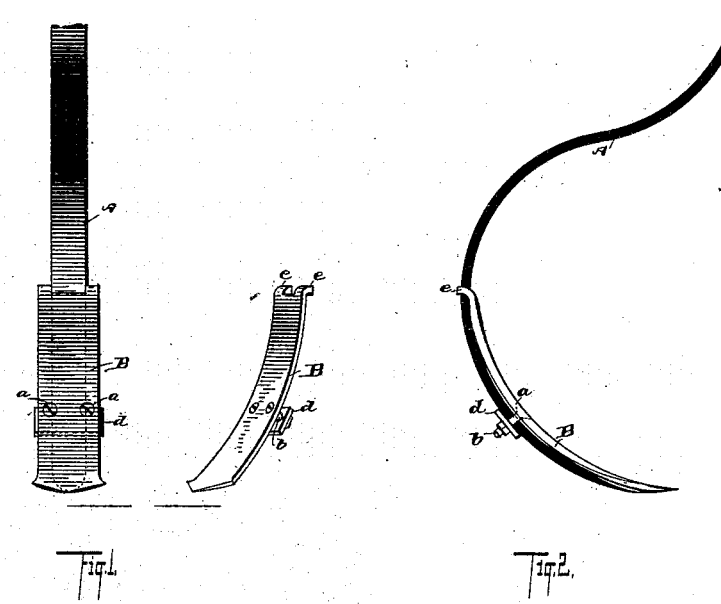
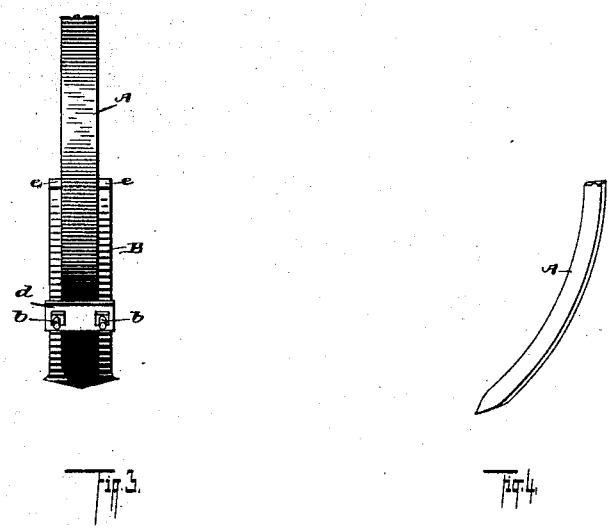
WITNESSES
Asa Clark, INVENTOR
By Leggett & Leggett, Attorneys

United States Patent Office.

ASA CLARK, OF KALAMAZOO, MICHIGAN, ASSIGNOR TO MOSES HILL, OF SAME PLACE.

HARROW OR CULTIVATOR TOOTH.

SPECIFICATION forming part of Letters Patent No. 356,985, dated February 1, 1887.

Application filed October 11, 1886. Serial No. 215,922. (No model.)

*To all whom it may concern:*

Be it known that I, ASA CLARK, of Kalamazoo, in the county of Kalamazoo and State of Michigan, have invented certain new and useful Improvements in Harrow or Cultivator Teeth; and I do hereby declare the following to be a full, clear, and exact description of the invention, such as will enable others skilled in the art to which it pertains to make and use the same.

My invention relates to harrow or cultivator teeth; and it consists in providing a tooth with an auxiliary point so constructed and applied as to be readily and firmly secured to the tooth or detached therefrom, as may be desired or found necessary. It is often found desirable in harrowing or cultivating the soil to increase the width of the tooth at the point. Heretofore this has been effected by forming what is known as a "spliced tooth," or making a tooth in two parts—viz., a shank and a detachable point or shovel—and forming these points or shovels of varying widths, and adapting them to perform various functions, and providing a peculiar coupling between the shanks and points, so that a point of one width may be replaced by a wider or narrower point or shovel. This mode of forming the teeth of harrows or cultivators is objectionable, inasmuch as a splice is formed intermediate between the point of contact of the tooth with the soil and its point of contact with the frame of the harrow or cultivator, generally rendering this splice or coupling the weakest portion of the tooth, and more or less liable to get out of order, and sometimes parts of the coupling become broken and render the whole tooth, both point and shank, useless, and necessitating its replacement with a new tooth. It is also desirable, especially in spring-tooth harrows, that the teeth be formed of a single piece without joint or splice, the object of this being to render them equally yielding in all portions of the tooth and less liable to collect weeds, &c., which, when spliced teeth are used, are caught by and collected in the joint or splice.

By my arrangement of teeth and auxiliary point I can use the implement both for harrowing and cultivating. When acting as a harrow, the common construction of a spring-tooth is used, which is made of one continuous piece of spring metal and having the usual point formed intregal with it. When it is desirable to use a wider point than that of the tooth, I place on the face of the tooth a plate or shovel of the desired width, and secure it to the point or lower end of the tooth by a suitable clip, which clip is so formed that it embraces the point of the tooth and hugs the wider point or shovel to it, thus obviating the necessity of cutting away or weakening the tooth proper.

In the accompanying drawings, Figure 1 represents a view in front elevation of a harrow-tooth, showing the auxiliary shovel or point attached. Fig. 2 is a view in side elevation. Fig. 3 is a view in rear elevation of the same. Fig. 4 represents a usual form of spring harrow-tooth without the auxiliary point, and such as is used for common harrowing.

A represents a spring harrow-tooth which is constructed in any of the well-known forms and of one continuous piece of metal and adapted to be used for harrowing the soil, having its point suitably formed and made intregal with it.

B is an auxiliary point or shovel formed of greater width than the point of the tooth A and being suitably shaped on its end for entering the soil. This auxiliary point or shovel is provided with a suitable clip adapted to embrace the tooth A and secure the said auxiliary point or shovel at or near the point of the aforesaid tooth A. This clip I preferably form as shown in Figs. 1, 2, and 3. The auxiliary point or shovel B is provided with two countersunk holes, *a a*, located at a point midway between the ends of the tooth, and of sufficient distance apart to admit of the bolts *b b*, inserted therein, to straddle the tooth A. The screw-threaded ends of these bolts are inserted in holes *c c*, formed in a small bar, *d*, and then the nuts screwed thereon and up, clamping the tooth A between the said bar *d* and the rear of the auxiliary point B. As the curvature of the auxiliary point B is the same as that of the tooth A at the point it is supported in the rear by the tooth A.

The auxiliary tooth B may be made so as to be reversible, or it may be formed, as shown in the drawings, Figs. 1, 2, and 3, with a portion of the upper end cut away, thus forming two lips, e e, which are bent at an angle to the point and adapted to straddle the tooth A, holding the point B more firmly from lateral movement.

What I claim is—

1. The combination, with a spring harrow-tooth, of an auxiliary point or shovel having countersunk holes a a, the bar d, and the bolts b b, for securing the bar to the auxiliary tooth, substantially as set forth.

2. The combination, with a spring-tooth, of an auxiliary tooth or point having its upper end cut away to enable it to straddle the spring-tooth, and a clip adapted to secure the auxiliary tooth to the spring-tooth, substantially as set forth.

In testimony whereof I sign this specification, in the presence of two witnesses, this 21st day of August, 1886.

ASA CLARK.

Witnesses:
WM. G. HOWARD,
JOHN W. ROWLEY.